Figure 1:
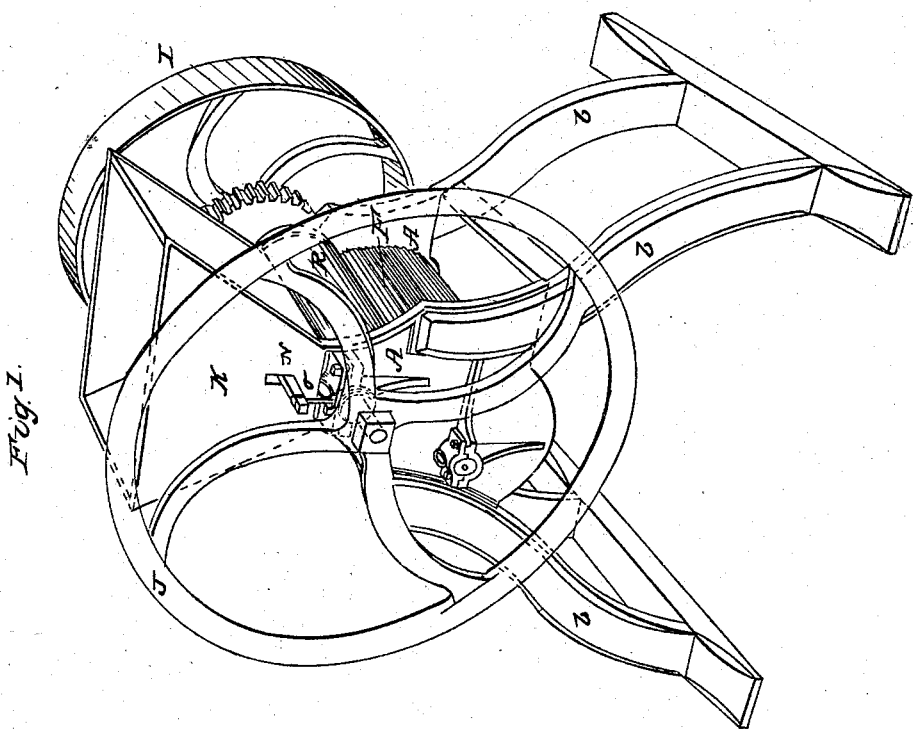

BANTZ & ANDREW

Grinding Mill.

No. 8,243.

2 Sheets—Sheet 1.

Patented July 22, 1851.

BANTZ & ANDREW
Grinding Mill.
No. 8,243.
2 Sheets—Sheet 2.
Patented July 22, 1851.
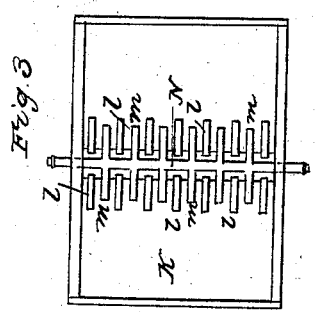
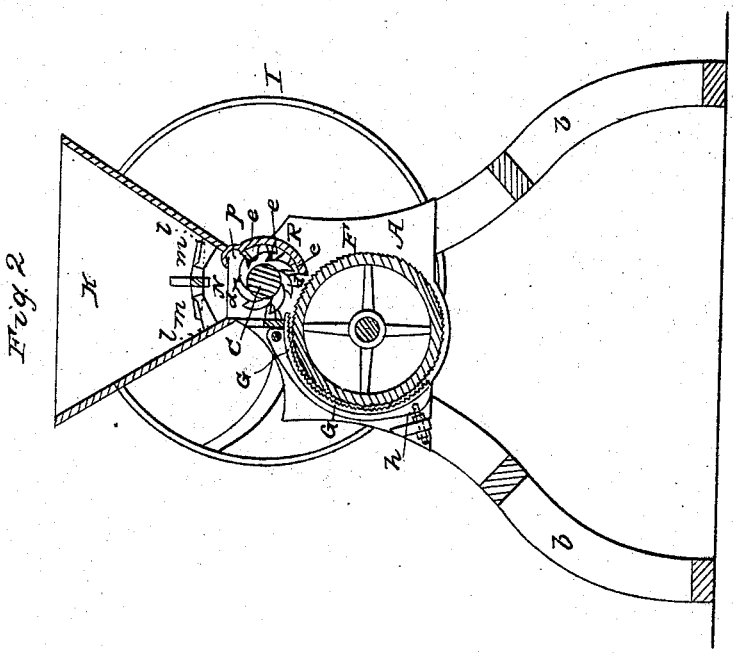

UNITED STATES PATENT OFFICE.

SIDNEY A. BANTZ AND WILLIAM ANDREW, OF FREDERICK, MARYLAND.

MILL FOR GRINDING CORN AND COBS.

Specification of Letters Patent No. 8,243, dated July 22, 1851.

*To all whom it may concern:*

Be it known that we, SIDNEY A. BANTZ and WILLIAM ANDREW, of the city and county of Frederick and State of Maryland, have invented a new and useful Improvement in Mills for Grinding Corn, Cobs, and other Substances, of which the following is a full, clear, and exact description, reference being had to the accompanying drawings, which form part of this specification, and in which—

Figure 1 represents a view in perspective of our improved mill for grinding corn and cobs. Fig. 2 is a vertical transverse section of the same, and Fig. 3 is a plan of the hopper with its chopper.

Our mill is constructed to grind substances by means of toothed cylinders which work in connection with corresponding toothed concaves, and our improvement consists in a device by means of which the substances introduced into the hopper are chopped or broken into coarse fragments and are then fed to the grinding apparatus.

In the accompanying drawing, A A are the sides of the case in which the grinding apparatus is contained and which are supported at a suitable height by legs $b$. The grinding apparatus, consists in the present instance of two cylinders and their appropriate concaves. The upper cylinder C is the smaller of the two and is furnished with large hooked teeth $d$ which act in connection with similar fixed teeth $e$ on the concave to grind the substances coarsely. The lower cylinder F is considerably larger than the upper one and its barrel is fluted from end to end, the indentations being of the shape shown in section at Fig. 2. The concave G which acts in connection with this cylinder is fluted in a corresponding manner as shown at Fig. 2 and is set by means of set screws $h$ at such a distance from the barrel of the cylinder as will cause the two to reduce the substances ground to the required fineness. The journals of the shafts of the two cylinders are supported in suitable boxes on the side pieces A; at one side of the mill they extend beyond the boxes and are fitted with two cog-wheels by means of which the lower cylinder is caused to revolve when the upper one is turned. Motion is imparted to the upper one by means of a belt which encircles a belt pulley I secured to it, and the motion is equalized by a fly wheel J which is secured to the opposite extremity of its shaft.

The grinding apparatus thus described is surmounted by a hopper K in which the substances to be ground are introduced and which also contains the chopper and feeder. This consists of two sets of teeth or knives, the one being stationary, while the other is caused to rise and fall in the spaces between the teeth of the stationary set. The latter $l$ are projected from the sides of the hopper and are turned up at their extremities to facilitate the breaking of the substances. The moving set of teeth $m$ are projected in opposite directions from a central bar or stock N which extends the whole length of the hopper and passes through slots in its ends; its projecting extremities are connected by means of link bars $o$ with the straps or rings of a pair of eccentrics which are secured to the opposite extremities of the shaft of the upper cylinder, so that as the latter is turned this stock with the knives secured thereto is forced to move up and down. As it rises the substances in the hopper lodge between its knives and the stationary ones beneath, and as it is depressed these substances are chopped or broken and the fragments are forced through the spaces between the stationary teeth toward the grinding apparatus immediately beneath. In order to prevent the escape of these fragments as the cylinder teeth come in contact with them, a recess $p$ is formed in the upper portion of the concave R of this cylinder which prevents the fragments from working out when the teeth strikes them.

It is obvious that many different ways of shaping the teeth and of working the breaker and feeder might be adopted with greater or less advantage; as many such plans will readily suggest themselves to the skillful machinist, I do not deem it necessary to describe minutely others than the one above mentioned as that has been found to work well in practice.

What we claim as our invention and desire to secure by Letters Patent is—

1. The chopping and feeding apparatus constructed and operating as herein described in connection with a grinding apparatus.

2. We also claim the recess ($p$) in the concave which prevents the escape of fragments when struck by the teeth of the cylinder.

In testimony whereof they have hereunto signed their names.

SIDNEY A. BANTZ.
WILLIAM ANDREW.

Witnesses:
E. S. RENWICK,
P. H. WATSON.